US010895395B2

(12) United States Patent
Kojima et al.

(10) Patent No.: US 10,895,395 B2
(45) Date of Patent: Jan. 19, 2021

(54) AIR-CONDITIONER REMOTE CONTROLLER AND AIR-CONDITIONING CONTROL SYSTEM

(71) Applicant: Mitsubishi Electric Corporation, Tokyo (JP)

(72) Inventors: Yoshihisa Kojima, Tokyo (JP); Yoshiaki Koizumi, Tokyo (JP); Hidetoshi Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/774,061

(22) PCT Filed: Jan. 29, 2016

(86) PCT No.: PCT/JP2016/052731
§ 371 (c)(1),
(2) Date: May 7, 2018

(87) PCT Pub. No.: WO2017/130391
PCT Pub. Date: Aug. 3, 2017

(65) Prior Publication Data
US 2018/0320918 A1    Nov. 8, 2018

(51) Int. Cl.
*F24F 11/56* (2018.01)
*G05B 19/02* (2006.01)
(Continued)

(52) U.S. Cl.
CPC .............. *F24F 11/56* (2018.01); *G05B 19/02* (2013.01); *F24F 2110/10* (2018.01); *F24F 2120/10* (2018.01); *G05B 2219/2614* (2013.01)

(58) Field of Classification Search
CPC .... F24F 11/56; F24F 2120/10; F24F 2110/10; G05B 19/02; G05B 2219/2614
(Continued)

(56) References Cited

U.S. PATENT DOCUMENTS 9,151,510 B2    10/2015  Leen
2005/0040943 A1  2/2005  Winick
(Continued)

FOREIGN PATENT DOCUMENTS

JP    2002-310490 A    10/2002
JP    2004-279000 A    10/2004
(Continued)

OTHER PUBLICATIONS

Naoya Matsunaga, "Air-Conditioning Control System" Translation of Japanese Application (JP2008249172A), Oct. 16, 2008, Espacenet Translation (Year: 2008).*
(Continued)

*Primary Examiner* — Robert E Fennema
*Assistant Examiner* — Christopher W Carter
(74) *Attorney, Agent, or Firm* — Posz Law Group, PLC

(57) ABSTRACT

An air-conditioner remote controller in an air conditioner system that includes the air-conditioner remote controller and an air conditioner that performs air-conditioning control using room temperature information received from the air-conditioner remote controller, includes: a storage unit to store room temperature information that is information on room temperature measured by a plurality of temperature sensors and store schedule information that sets, for each time zone, a temperature sensor to measure a room temperature to be used as room temperature information in the air-conditioning control of the air conditioner; and a control unit to perform control such that the room temperature information from the set temperature sensor is acquired from the storage unit and the acquired room temperature information is transmitted to the air conditioner in accordance with the schedule information.

10 Claims, 9 Drawing Sheets

(51) Int. Cl.
  *F24F 120/10* (2018.01)
  *F24F 110/10* (2018.01)
(58) Field of Classification Search
  USPC .......................................................... 700/276
  See application file for complete search history.

(56) References Cited

U.S. PATENT DOCUMENTS

| | | | | |
|---|---|---|---|---|
| 2010/0010679 | A1* | 1/2010 | Kassel | G05D 23/1931 700/278 |
| 2010/0036625 | A1* | 2/2010 | Martin | G01K 1/14 702/62 |
| 2011/0127341 | A1 | 6/2011 | Kaneoya et al. | |
| 2011/0253796 | A1* | 10/2011 | Posa | G05D 23/1934 236/49.3 |
| 2012/0253521 | A1* | 10/2012 | Storm | G05D 23/1905 700/276 |

FOREIGN PATENT DOCUMENTS

| | | |
|---|---|---|
| JP | 2008-045779 A | 2/2008 |
| JP | 2008-249172 A | 10/2008 |
| JP | 2008-286460 A | 11/2008 |
| JP | 2010-048531 A | 3/2010 |
| JP | 2011-112298 A | 6/2011 |
| JP | 4706976 B2 | 6/2011 |
| JP | 2013-064537 A | 4/2013 |
| JP | 2013-231549 A | 11/2013 |
| JP | 2015-162860 A | 9/2015 |

OTHER PUBLICATIONS

International Search Report of the International Searching Authority dated Apr. 26, 2016 for the corresponding International application No. PCT/JP2016/052731 (and English translation).
Extended European Search Report dated Dec. 13, 2018 issued in corresponding EP patent application No. 16887977.3.
Office Action dated Apr. 17, 2019 issued in corresponding AU patent application No. 2016389578.
Office Action dated Oct. 15, 2019 issued in corresponding AU patent application No. 2016389578.
Office Action dated Dec. 25, 2019 issued in corresponding CN patent application No. 201680077534.1 (and English translation).
Office Action dated Jun. 2, 2020 issued in corresponding CN patent application No. 201680077534.1 (and English translation).
"Household Appliance Maintenance 2004". Volkswagen Magazine, Jan. 2005, p. 580-585 (and English translation).
Office Action dated Oct. 12, 2020 issued in corresponding CN patent application No. 201680077534.1 (and English translation).

* cited by examiner

FIG.2

| | MONDAY | TUESDAY | WEDNESDAY | THURSDAY | FRIDAY | SATURDAY | SUNDAY |
|---|---|---|---|---|---|---|---|
| 0:00 – 2:00 | INLET-PORT TEMPERATURE SENSOR | INLET-PORT TEMPERATURE SENSOR | INLET-PORT TEMPERATURE SENSOR | INLET-PORT TEMPERATURE SENSOR | INLET-PORT TEMPERATURE SENSOR | | |
| 2:00 – 4:00 | | | | | | INLET-PORT TEMPERATURE SENSOR | INLET-PORT TEMPERATURE SENSOR |
| 4:00 – 6:00 | EXTERNAL TEMPERATURE SENSOR #1 | EXTERNAL TEMPERATURE SENSOR #1 | EXTERNAL TEMPERATURE SENSOR #1 | EXTERNAL TEMPERATURE SENSOR #1 | EXTERNAL TEMPERATURE SENSOR #1 | | |
| 6:00 – 8:00 | | | | | | EXTERNAL TEMPERATURE SENSOR #3 | EXTERNAL TEMPERATURE SENSOR #3 |
| 8:00 – 10:00 | BUILT-IN TEMPERATURE SENSOR | BUILT-IN TEMPERATURE SENSOR | BUILT-IN TEMPERATURE SENSOR | BUILT-IN TEMPERATURE SENSOR | BUILT-IN TEMPERATURE SENSOR | | |
| 10:00 – 12:00 | | | | | | EXTERNAL TEMPERATURE SENSORS #4, #5 | EXTERNAL TEMPERATURE SENSORS #4, #5 |
| 12:00 – 14:00 | EXTERNAL TEMPERATURE SENSOR #2 | EXTERNAL TEMPERATURE SENSOR #2 | EXTERNAL TEMPERATURE SENSOR #2 | EXTERNAL TEMPERATURE SENSOR #2 | EXTERNAL TEMPERATURE SENSOR #2 | | |
| 14:00 – 16:00 | | | | | | INLET-PORT TEMPERATURE SENSOR | INLET-PORT TEMPERATURE SENSOR |
| 16:00 – 18:00 | INLET-PORT TEMPERATURE SENSOR | INLET-PORT TEMPERATURE SENSOR | INLET-PORT TEMPERATURE SENSOR | INLET-PORT TEMPERATURE SENSOR | INLET-PORT TEMPERATURE SENSOR | | |

FIG. 9

|  | MONDAY | TUESDAY | WEDNESDAY | THURSDAY | FRIDAY | SATURDAY | SUNDAY |
|---|---|---|---|---|---|---|---|
| 0:00 |  |  |  |  |  |  |  |
| 2:00 | INLET-PORT TEMPERATURE SENSOR | INLET-PORT TEMPERATURE SENSOR | INLET-PORT TEMPERATURE SENSOR | INLET-PORT TEMPERATURE SENSOR | INLET-PORT TEMPERATURE SENSOR | INLET-PORT TEMPERATURE SENSOR | INLET-PORT TEMPERATURE SENSOR |
| 4:00 |  |  |  |  |  |  |  |
| 6:00 | EXTERNAL TEMPERATURE SENSOR #1 | EXTERNAL TEMPERATURE SENSOR #1 | EXTERNAL TEMPERATURE SENSOR #1 | EXTERNAL TEMPERATURE SENSOR #1 | EXTERNAL TEMPERATURE SENSOR #1 | EXTERNAL TEMPERATURE SENSOR #3 | EXTERNAL TEMPERATURE SENSOR #3 |
| 8:00 |  |  |  |  |  |  |  |
| 10:00 | BUILT-IN TEMPERATURE SENSOR *HUMAN PRESENCE PRIORITY | BUILT-IN TEMPERATURE SENSOR *HUMAN PRESENCE PRIORITY | BUILT-IN TEMPERATURE SENSOR *HUMAN PRESENCE PRIORITY | BUILT-IN TEMPERATURE SENSOR *HUMAN PRESENCE PRIORITY | BUILT-IN TEMPERATURE SENSOR *HUMAN PRESENCE PRIORITY | EXTERNAL TEMPERATURE SENSORS #4, #5 | EXTERNAL TEMPERATURE SENSORS #4, #5 |
| 12:00 |  |  |  |  |  |  |  |
| 14:00 |  |  |  |  |  |  |  |
| 16:00 |  |  |  |  |  |  |  |
| 18:00 | EXTERNAL TEMPERATURE SENSOR #2 | EXTERNAL TEMPERATURE SENSOR #2 | EXTERNAL TEMPERATURE SENSOR #2 | EXTERNAL TEMPERATURE SENSOR #2 | EXTERNAL TEMPERATURE SENSOR #2 | INLET-PORT TEMPERATURE SENSOR | INLET-PORT TEMPERATURE SENSOR |
| 20:00 |  |  |  |  |  |  |  |
| 22:00 | INLET-PORT TEMPERATURE SENSOR | INLET-PORT TEMPERATURE SENSOR | INLET-PORT TEMPERATURE SENSOR | INLET-PORT TEMPERATURE SENSOR | INLET-PORT TEMPERATURE SENSOR |  |  |
| 24:00 |  |  |  |  |  |  |  | ined with the schedule information. FIG. 1 is a diagram illustrating an exemplary configuration of an air conditioner system that includes an air-conditioner remote controller according to a first embodiment.
AIR-CONDITIONER REMOTE CONTROLLER AND AIR-CONDITIONING CONTROL SYSTEM

CROSS REFERENCE TO RELATED APPLICATION

This application is a U.S. national stage application of International Patent Application No. PCT/JP2016/052731 filed on Jan. 29, 2016, the disclosure of which is incorporated herein by reference.

TECHNICAL FIELD

The present invention relates to an air-conditioner remote controller that operates an air conditioner and to an air-conditioning control system.

BACKGROUND

In some conventional air conditioner systems in which room temperature information from multiple temperature sensors installable in different rooms or the like is used, which temperature sensor's room temperature information should be used by an air conditioner in air-conditioning control for each time zone is settable from a remote controller. In Patent Literature 1, a technique is disclosed in which an air conditioner performs air-conditioning control by managing room temperature information from temperature sensors and switching the room temperature information of the temperature sensors to be used on the basis of a schedule that has been set.

PATENT LITERATURE

Patent Literature 1: Japanese Patent Application Laid-open No. 2004-279000

The conventional technique described above, however, requires the air conditioner to obtain and manage the room temperature information from the temperature sensors and store a schedule of the temperature sensors to be used in the air-conditioning control. If an air conditioner does not have such functions, it is necessary to replace the air conditioner itself; this poses a problem that existing users who already own air conditioners have difficulty in starting to use a system that performs air-conditioning control by using a plurality of temperature sensors.

SUMMARY

The present invention has been achieved in view of the above, and an object of the present invention is to provide an air-conditioner remote controller that enables control of an air conditioner by using room temperature information from a plurality of temperature sensors.

To solve the problem described above and achieve the object described above, an air-conditioner remote controller according to an aspect of the present invention is an air-conditioner remote controller in an air conditioner system that includes the air-conditioner remote controller and an air conditioner that performs air-conditioning control using room temperature information received from the air-conditioner remote controller. The air-conditioner remote controller includes a storage unit to store room temperature information that is information on room temperature measured by a plurality of temperature sensors and store schedule information that sets, for each time zone, a temperature sensor to measure a room temperature to be used as room temperature information in the air-conditioning control of the air conditioner. Moreover, the air-conditioner remote controller includes a control unit to perform control such that the room temperature information from the set temperature sensor is acquired from the storage unit and the acquired room temperature information is transmitted to the air conditioner in accordance with the schedule information.

An air-conditioner remote controller according to the present invention produces an effect of enabling control of an air conditioner by using room temperature information from a plurality of temperature sensors.

BRIEF DESCRIPTION OF DRAWINGS

FIG. 2 is a diagram illustrating an example of schedule information stored in a storage unit of the air-conditioner remote controller according to the first embodiment.

FIG. 9 is a diagram illustrating an example of the schedule information stored in the storage unit of the air-conditioner remote controller according to the fourth embodiment.

DETAILED DESCRIPTION

An air-conditioner remote controller and an air-conditioning control system according to embodiments of the present invention are described below in detail with reference to the drawings. The present invention is not limited to the embodiments.

First Embodiment

Figure 1:
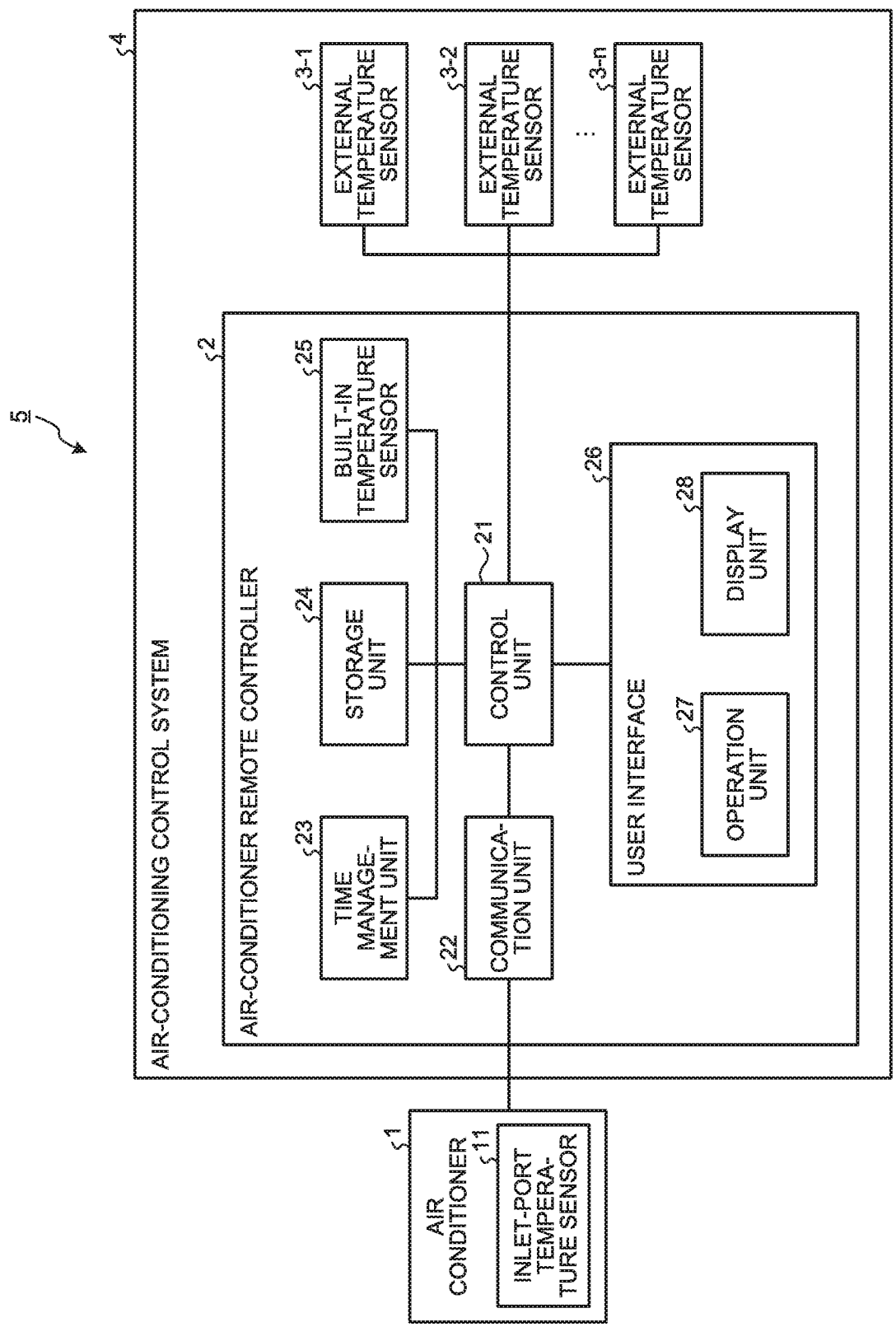
FIG. 1 is a diagram illustrating an exemplary configuration of an air conditioner system that includes an air-conditioner remote controller according to a first embodiment.

FIG. 1 is a diagram illustrating an exemplary configuration of an air conditioner system 5, which includes an air-conditioner remote controller 2 according to a first embodiment of the present invention. The air conditioner system 5 includes an air conditioner 1, the air-conditioner remote controller 2, and external temperature sensors 3-1, 3-2, . . . , and 3-n. The air-conditioner remote controller 2 and the external temperature sensors 3-1, 3-2, . . . , and 3-n configure an air-conditioning control system 4 that controls an operation of the air conditioner 1.

The air conditioner 1 performs air-conditioning control using room temperature information that is received from the air-conditioner remote controller 2 and that is information on the room temperature measured by any one of a built-in temperature sensor 25, which is included in the air-conditioner remote controller 2, the external temperature sensor 3-1, 3-2, . . . , or 3-n, and an inlet-port temperature sensor 11, which is placed at an inlet port of the air conditioner 1.

The air-conditioner remote controller 2 is a remote controller for an air conditioner that automatically switches the room temperature information to be used in the air-conditioning control of the air conditioner 1 for each time zone. Communication between the air-conditioner remote controller 2 and the air conditioner 1 may be wireless communication or wire communication.

The external temperature sensors 3-1, 3-2, . . . , and 3-n are temperature sensors that are placed in an area targeted for the air-conditioning control of the air conditioner 1. Communication between the air-conditioner remote controller 2 and the external temperature sensors 3-1, 3-2, . . . , and 3-n may be wireless communication or wire communication. Although omitted in FIG. 1, the external temperature sensors 3-1, 3-2, . . . , and 3-n each include a communication unit that performs communication with the air-conditioner remote controller 2. This is similarly applicable to the following embodiments. The external temperature sensors 3-1, 3-2, . . . , and 3-n may be referred to as the external temperature sensors 3 when the external temperature sensors 3-1, 3-2, . . . , and 3-n are not distinguished from each other.

The configuration of the air-conditioner remote controller 2 is described below in detail next. The air-conditioner remote controller 2 includes a control unit 21, a communication unit 22, a time management unit 23, a storage unit 24, the built-in temperature sensor 25, and a user interface 26. The user interface 26 includes an operation unit 27 and a display unit 28.

The control unit 21 controls an operation of the air-conditioner remote controller 2. The control unit 21 performs control such that the room temperature information to be used in the air-conditioning control is transmitted to the air conditioner 1 via the communication unit 22.

The communication unit 22 communicates with the air conditioner 1 by wire or wirelessly.

The time management unit 23 manages current time information. A user sets the time information in the air-conditioner remote controller 2 via the user interface 26 when an operation of the air conditioner system 5 is started or when a battery in the air-conditioner remote controller 2 is replaced, for example, and, then, the time management unit 23 keeps the current time. When a user sets the time information, the user sets the time information including days of the week in the air-conditioner remote controller 2.

The storage unit 24 stores the room temperature information that is the information on the room temperature measured by each of the built-in temperature sensor 25, the external temperature sensors 3, and the inlet-port temperature sensor 11 of the air conditioner 1. The storage unit 24 also stores schedule information that sets, for each time zone, a temperature sensor that measures the room temperature to be used in the air-conditioning control of the air conditioner 1.

The built-in temperature sensor 25 is a temperature sensor that measures the room temperature near the air-conditioner remote controller 2.

The user interface 26 displays the schedule information stored in the storage unit 24 on the display unit 28 and receives an operation by a user via the operation unit 27 when the user sets or changes a time zone for any one of the temperature sensors in the schedule information. The control unit 21 sets or changes the schedule information in the storage unit 24 on the basis of operation information received via the operation unit 27 of the user interface 26. The user interface 26 also displays an operation mode, a set temperature, and the like on the display unit 28 and receives an operation instruction, a set temperature instruction, or the like from a user via the operation unit 27. The control unit 21 transmits the operation instruction, the set temperature instruction, or the like received via the operation unit 27 of the user interface 26 to the air conditioner 1 via the communication unit 22.

When the air conditioner system 5 is installed, a user sets, from the user interface 26 of the air-conditioner remote controller 2, a connection of each of the external temperature sensors 3 and assigns a name to each of the external temperature sensors 3. The user also sets, from the user interface 26 of the air-conditioner remote controller 2, one or more of the external temperature sensors 3-1, 3-2, . . . , and 3-n, the built-in temperature sensor 25, and the inlet-port temperature sensor 11 of the air conditioner 1 as a temperature sensor to be set in the schedule information.

FIG. 2 is a diagram illustrating an example of the schedule information stored in the storage unit 24 of the air-conditioner remote controller 2 according to the first embodiment. The schedule information is information in which a temperature sensor that measures the room temperature to be used in the air-conditioning control of the air conditioner 1 is set by a user for each time zone and each day of the week. Here, as an example, identical ones of the temperature sensors are set for the time zones of weekdays from Monday to Friday and identical ones of the temperature sensors are set for the time zones of the weekend on Saturday and Sunday. Five external temperature sensors 3 are assumed here; external temperature sensors #1 to #5 in FIG. 2 correspond to the external temperature sensors 3-1 to 3-5, respectively. With the air-conditioner remote controller 2, a user can check the schedule information displayed on the display unit 28 of the user interface 26 and set or change the temperature sensors, the time zones, or the days of the week in the schedule information from the operation unit 27 of the user interface 26. In the air-conditioner remote controller 2, the control unit 21 sets and stores the schedule information in the storage unit 24 or changes the schedule information stored in the storage unit 24 in accordance with the operation information to set or change the schedule information received from the user via the operation unit 27.

In the air conditioner system 5, the control unit 21 of the air-conditioner remote controller 2 is connected to the external temperature sensors 3 by wireless communication, such as Bluetooth (registered trademark) and Wi-Fi, or wire communication. The control unit 21 acquires, from the external temperature sensors 3, the room temperature information that is the information on room temperature measured by the external temperature sensors 3 and stores the room temperature information in the storage unit 24. The control unit 21 is connected to the built-in temperature sensor 25 and acquires, from the built-in temperature sensor 25, the room temperature information that is the information on the room temperature measured by the built-in temperature sensor 25 and stores the room temperature information in the storage unit 24. The control unit 21 is connected to the air conditioner 1 via the communication unit 22. The control unit 21 acquires, from the air conditioner 1, the room temperature information that is the information on the room temperature measured by the inlet-port temperature sensor 11 of the air conditioner 1 and stores the room temperature information in the storage unit 24. The control unit 21 acquires the room temperature information from each of the temperature sensors at regular time intervals and updates the room temperature information in the storage unit 24.

The control unit 21 also determines the room temperature information from the external temperature sensors 3, the room temperature information from the built-in temperature sensor 25, or the room temperature information from the inlet-port temperature sensor 11 of the air conditioner 1, which are stored in the storage unit 24, as the room temperature information to be transmitted to the air conditioner 1 in accordance with the temperature sensor that is set for each time zone in the schedule information stored in the storage unit 24. If one temperature sensor is set for each time zone in the schedule information, the control unit 21 acquires, from the storage unit 24, the room temperature information of the temperature sensor that corresponds to the temperature sensor set in the schedule information and transmits the room temperature information to the air conditioner 1 via the communication unit 22.

If multiple temperature sensors are set for a single time zone in the schedule information, the control unit 21 acquires, from the storage unit 24, the room temperature information of the multiple temperature sensors that correspond to the temperature sensors set in the schedule information, calculates a mean value of the acquired room temperature information of the multiple temperature sensors, and transmits the value to the air conditioner 1 via the communication unit 22. Since two temperature sensors, namely the external temperature sensors #4 and #5, are set in a time zone from 14:00 to 20:00 on Saturday and Sunday in the example in FIG. 2, the control unit 21 acquires the room temperature information of the external temperature sensors #4 and #5 from the storage unit 24, calculates a mean value of the acquired room temperature information of the external temperature sensors #4 and #5, and transmits the value to the air conditioner 1 via the communication unit 22. When a user sets multiple temperature sensors for a single time zone in the schedule information, the user may select, in addition to the combination of the external temperature sensors 3, a combination of the external temperature sensor 3 and the built-in temperature sensor 25, a combination of the external temperature sensor 3 and the inlet-port temperature sensor 11, or a combination of the built-in temperature sensor 25 and the inlet-port temperature sensor 11. The control unit 21 can change the temperature sensor that measures the room temperature information to be transmitted to the air conditioner 1 in accordance with the schedule information and operate the air conditioner 1 by cooperating with the time management unit 23 and the storage unit 24.

In the air conditioner system 5, the air conditioner 1 uses the room temperature information received from the air-conditioner remote controller 2 and performs the air-conditioning control such that the room temperature information, or the room temperature, agrees with the set temperature indicated by the air-conditioner remote controller 2.

To perform the air-conditioning control in a time zone for which a temperature sensor set in the schedule information is the inlet-port temperature sensor 11 of the air conditioner 1, the air-conditioner remote controller 2 may instruct the air conditioner 1 to use the room temperature information from the inlet-port temperature sensor 11 of the air conditioner 1, that is, the inlet temperature, instead of transmitting the room temperature information measured by the inlet-port temperature sensor 11 and stored in the storage unit 24 to the air conditioner 1. The air conditioner 1 performs the air-conditioning control on the basis of the inlet temperature measured by the inlet-port temperature sensor 11 in accordance with the instruction from the air-conditioner remote controller 2.

Figure 3:
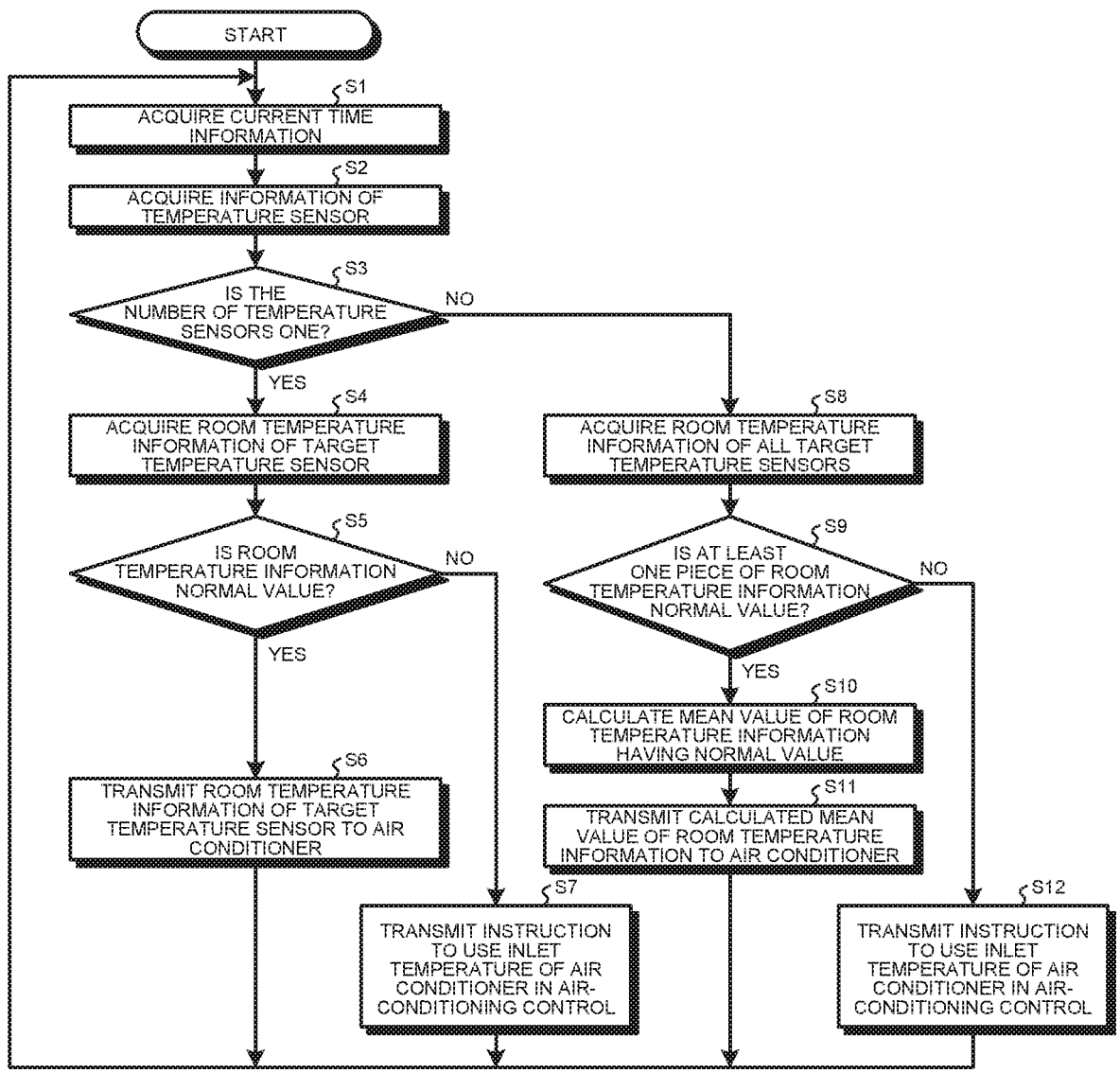
FIG. 3 is a flowchart illustrating an operation of the air-conditioner remote controller in the air conditioner system according to the first embodiment to change temperature sensors that measure room temperature to be used in air-conditioning control of an air conditioner in accordance with the schedule information and control an operation of the air conditioner.

An operation performed until when the air-conditioner remote controller 2 transmits the room temperature information to the air conditioner 1 is described below with reference to a flowchart. FIG. 3 is a flowchart illustrating an operation of the air-conditioner remote controller 2 in the air conditioner system 5 according to the first embodiment to change the temperature sensors that measure the room temperature to be used in the air-conditioning control of the air conditioner 1 in accordance with the schedule information and control the operation of the air conditioner 1.

First, the control unit 21 acquires the current time information from the time management unit 23 (step S1). The control unit 21 checks the schedule information stored in the storage unit 24 and acquires information on the temperature sensor(s) set in a time zone that corresponds to the current time from the schedule information (step S2). The control unit 21 checks to determine whether or not the number of temperature sensors set in the time zone corresponding to the current time in the schedule information is one (step S3).

If the number of temperature sensors set in the time zone corresponding to the current time in the schedule information is one (step S3: yes), the control unit 21 acquires room temperature information of the target temperature sensor set in the schedule information from the storage unit 24 (step S4). The control unit 21 determines whether or not the acquired room temperature information is within a normal value range (step S5). The normal range of the room temperature is set in the air-conditioner remote controller 2 in advance, for example, by user's operation or when the air-conditioner remote controller 2 is manufactured, and the control unit 21 determines that the room temperature information is a normal value if the room temperature information acquired from the storage unit 24 is within the normal value range.

If the room temperature information is a normal value (step S5: yes), the control unit 21 transmits the acquired target room temperature information to the air conditioner 1 via the communication unit 22 (step S6). If the room temperature information is not a normal value (step S5: no), the control unit 21 transmits, to the air conditioner 1 via the communication unit 22, an instruction to use the inlet temperature that is measured by the inlet-port temperature sensor 11 of the air conditioner 1 in the air-conditioning control (step S7).

With reference back to step S3, if the number of temperature sensors set in the time zone corresponding to the current time in the schedule information is more than one (step S3: no), the control unit 21 acquires room temperature information of all the target temperature sensors set in the schedule information from the storage unit 24 (step S8). The control unit 21 determines whether or not at least one piece of the acquired room temperature information is within the normal value range (step S9). The method with which the control unit 21 determines whether or not the room temperature information is a normal value is similar to that used in step S5 described above.

If at least one piece of the room temperature information is a normal value (step S9: yes), the control unit 21 calculates a mean value of the room temperature information from the room temperature information having the normal value (step S10) and transmits the calculated mean value of the room temperature information to the air conditioner 1 via the communication unit 22 (step S11). If none of the room temperature information is a normal value (step S9: no), the control unit 21 transmits, to the air conditioner 1 via the communication unit 22, an instruction to use the inlet temperature that is measured by the inlet-port temperature sensor 11 of the air conditioner 1 in the air-conditioning control (step S12). The control unit 21 performs the processing of the flowchart illustrated in FIG. 3 at regular time intervals repeatedly.

While a configuration in which the air-conditioner remote controller 2 includes the built-in temperature sensor 25 has been described as an example, a configuration in which the built-in temperature sensor 25 is not included may be used. In such a case, temperature sensors that are set in the schedule information are the inlet-port temperature sensor 11 of the air conditioner 1 and the external temperature sensors 3.

A hardware configuration of the air-conditioner remote controller 2 is described next. In the air-conditioner remote controller 2, a function with which the communication unit 22 and the control unit 21 each communicate with the external temperature sensors 3 is achieved with an interface circuit that performs wire communication or wireless communication. The time management unit 23 is achieved with a timer. The storage unit 24 is achieved with a memory. The built-in temperature sensor 25 is achieved with a thermistor or the like. The operation unit 27 of the user interface 26 is achieved with a switch or the like, and the display unit 28 is achieved with a display or the like. Functions of the control unit 21 other than the function with which to communicate with the external temperature sensors 3 are achieved with a processing circuitry. That is, the air-conditioner remote controller 2 includes a processing circuitry for transmitting the room temperature information of the temperature sensors to be used in the air-conditioning control to the air conditioner 1 in accordance with the schedule information. The processing circuitry may be dedicated hardware or a central processing unit (CPU) that performs a program stored in a memory and the memory.

Figure 4:
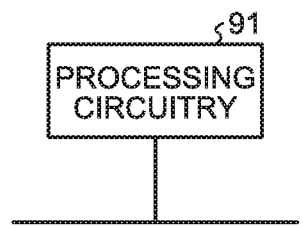
FIG. 4 is a diagram illustrating an example in which functions with which a control unit of the air-conditioner remote controller according to the first embodiment transmits room temperature information of the temperature sensors to be used in the air-conditioning control to the air conditioner in accordance with the schedule information are configured using dedicated hardware.

FIG. 4 is a diagram illustrating an example in which functions with which the control unit 21 of the air-conditioner remote controller 2 according to the first embodiment transmits the room temperature information of the temperature sensors to be used in the air-conditioning control to the air conditioner 1 in accordance with the schedule information are configured using dedicated hardware. When the processing circuitry is dedicated hardware, a processing circuitry 91 illustrated in FIG. 4 may be, for example, a single circuit, a compound circuit, a programmed processor, a parallel programmed processor, an application specific integrated circuit (ASIC), a field programmable gate array (FPGA), or a combination of them. The functions with which the control unit 21 transmits the room temperature information of the temperature sensors to be used in the air-conditioning control to the air conditioner 1 in accordance with the schedule information may be achieved with the processing circuitry 91 individually or collectively.

Figure 5:
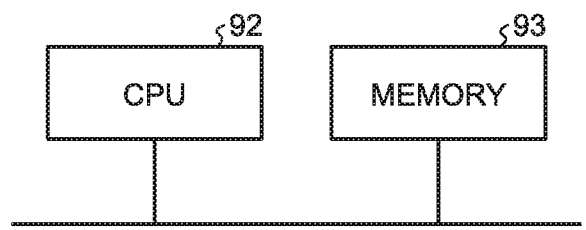
FIG. 5 is a diagram illustrating an example in which functions with which the control unit of the air-conditioner remote controller according to the first embodiment transmits the room temperature information of the temperature sensors to be used in the air-conditioning control to the air conditioner in accordance with the schedule information are configured using a CPU and a memory.

FIG. 5 is a diagram illustrating an example in which functions with which the control unit 21 of the air-conditioner remote controller 2 according to the first embodiment transmits the room temperature information of the temperature sensors to be used in the air-conditioning control to the air conditioner 1 in accordance with the schedule information are configured using a CPU and a memory. The memory for achieving the storage unit 24 may be identical with a memory 93 or different from the memory 93. When the processing circuitry is configured from a CPU 92 and the memory 93, the functions with which the control unit 21 transmits the room temperature information of the temperature sensors to be used in the air-conditioning control to the air conditioner 1 in accordance with the schedule information is achieved with software, firmware, or a combination of software and firmware. The software or firmware is described as a program and stored in the memory 93. In the processing circuitry, the CPU 92 reads and executes a program stored in the memory 93 to achieve each function. That is, the air-conditioner remote controller 2 includes the memory 93 to store a program which, when functions with which the room temperature information of the temperature sensors to be used in the air-conditioning control is transmitted to the air conditioner 1 in accordance with the schedule information are executed by the processing circuitry, results in steps being executed to transmit the room temperature information of the temperature sensors to be used in the air-conditioning control to the air conditioner 1 in accordance with the schedule information. In other words, these programs cause a computer to execute a procedure and a method of the air-conditioner remote controller 2. Here, the CPU 92 may be a processing unit, an arithmetic unit, a microprocessor, a microcomputer, a processor, a digital signal processor (DSP), or the like. The memory 93 may be, for example, a nonvolatile or volatile semiconductor memory such as a random access memory (RAM), a read only memory (ROM), a flash memory, an erasable programmable ROM (EPROM), and an electrically EPROM (EEPROM), a magnetic disk, a flexible disk, an optical disk, a compact disk, a mini disk, or a digital versatile disc (DVD).

The functions with which the room temperature information of the temperature sensors to be used in the air-conditioning control is transmitted to the air conditioner 1 in accordance with the schedule information in the air-conditioner remote controller 2 may be achieved partly with dedicated hardware and partly with software or firmware. As described above, the processing circuitry can achieve each of the functions described above using dedicated hardware, software, firmware, or a combination of them.

As described above, the air-conditioner remote controller 2 in the air conditioner system 5 according to the present embodiment stores the schedule information that sets, for each time zone, the temperature sensor that measures the room temperature to be used in air-conditioning control of the air conditioner 1, stores also room temperature information that is information on the room temperature measured by each of the temperature sensors, such as the built-in temperature sensor 25 and the external temperature sensors 3, and transmits, to the air conditioner 1, room temperature information from a target temperature sensor set for a time zone that corresponds to the current time in accordance with the schedule information. Thus, the air conditioner 1 performs the air-conditioning control using the room temperature information received from the air-conditioner remote controller 2 and thus can perform the air-conditioning control using room temperature information measured by the multiple temperature sensors, thereby enabling improvement in user comfort.

The air conditioner 1 may not necessarily include a plurality of temperature sensors or store schedule information that sets the temperature sensors that measure the room temperature to be used in the air-conditioning control. It is sufficient if the air conditioner 1 can use the room temperature information received from the air-conditioner remote controller 2 in the air-conditioning control and use the inlet temperature in the air-conditioning control when the air conditioner 1 receives an instruction from the air-conditioner remote controller 2 to use the inlet temperature in the air-conditioning control. The air-conditioner remote controller 2, whose product price is lower than the air conditioner 1, has a function of storing the room temperature information and the schedule information; therefore, ease with which a system that allows a user who already owns an air conditioner to control the air conditioner using any temperature sensor for each time zone is configured can be improved.

Additionally, the air-conditioner remote controller 2 enables a plurality of temperature sensors to be set in a single time zone when the schedule information is set, and calculates a mean value of the room temperature information from the plurality of temperature sensors to be set as room temperature information to be transmitted to the air conditioner 1. Thus, in a time zone in which users are likely to be in more than one room, the air conditioner system 5 can avoid cooling or heating excessively one of the rooms, thereby providing a comfortable space for all the users.

Additionally, if an anomaly occurs in a temperature sensor that is set in the schedule information in each time zone, that is, if there is room temperature information that is not a normal value, the air-conditioner remote controller 2 controls the air conditioner 1 using only room temperature information that is a normal value from a normal temperature sensor among the temperature sensors that are set in the target time zone. In this manner, the air conditioner system 5 can continue providing the air-conditioning control without interrupting the air conditioner 1 even if an anomaly occurs in a temperature sensor.

Second Embodiment

An air conditioner system that can control the air conditioner 1 from a wireless communication device, such as a smart phone, is described in a second embodiment. The difference from the first embodiment is described below.

Figure 6:
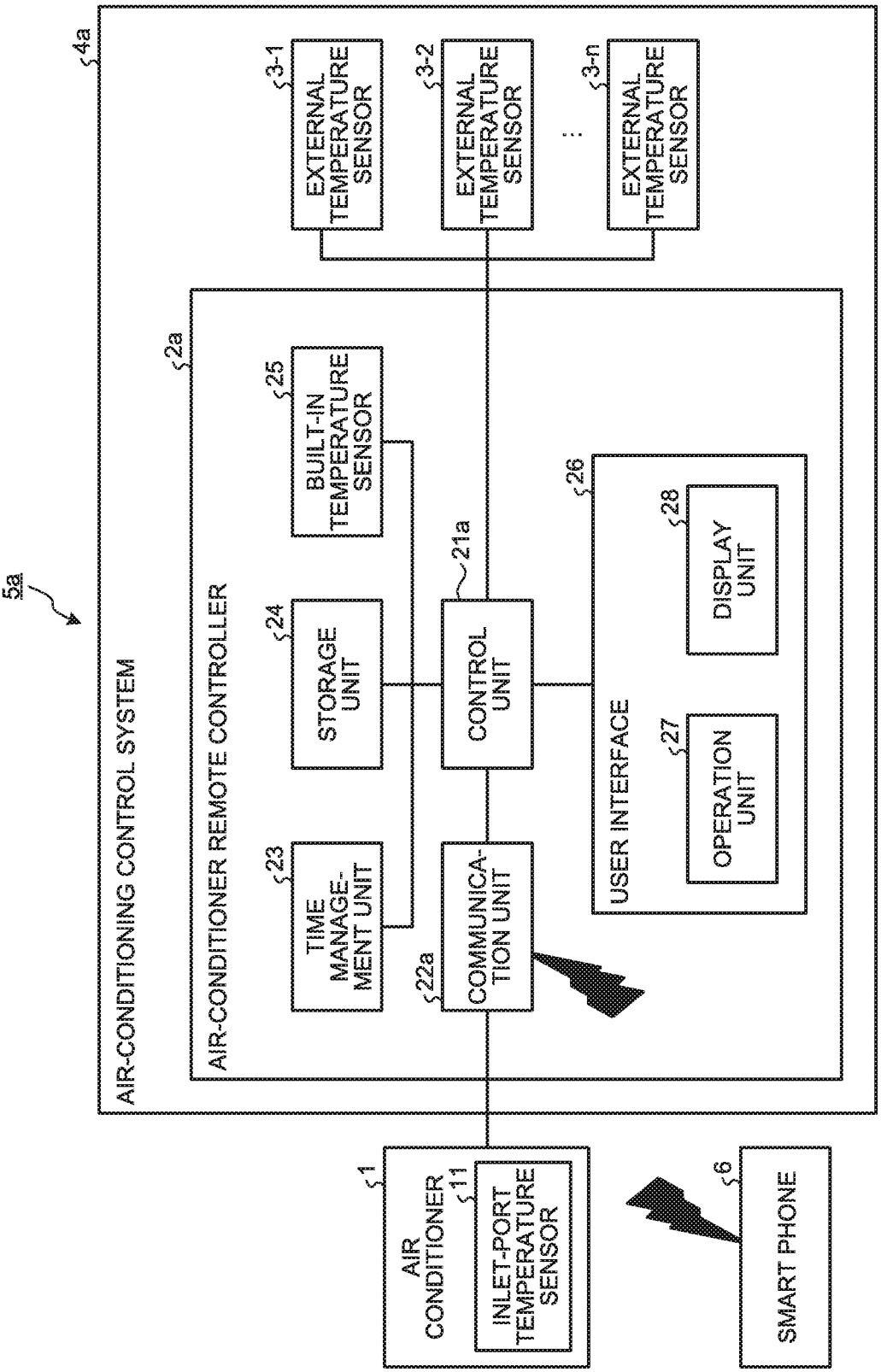
FIG. 6 is a diagram illustrating an exemplary configuration of an air conditioner system that includes an air-conditioner remote controller according to a second embodiment.

FIG. 6 is a diagram illustrating an exemplary configuration of an air conditioner system 5a, which includes an air-conditioner remote controller 2a according to the second embodiment. The air conditioner system 5a includes the air conditioner 1, the air-conditioner remote controller 2a, the external temperature sensors 3-1, 3-2, . . . , and 3-n, and a smart phone 6. The air-conditioner remote controller 2a and the external temperature sensors 3-1, 3-2, . . . , and 3-n configure an air-conditioning control system 4a.

The air-conditioner remote controller 2a receives an operation from the smart phone 6 and performs the air-conditioning control of the air conditioner 1, in addition to performing the functions of the air-conditioner remote controller 2 according to the first embodiment. In comparison with the air-conditioner remote controller 2, the air-conditioner remote controller 2a includes a control unit 21a and a communication unit 22a in place of the control unit 21 and the communication unit 22 of the air-conditioner remote controller 2, respectively.

The control unit 21a acquires operation information from the smart phone 6 via the communication unit 22a, performs the air-conditioning control of the air conditioner 1 and, for example, sets and changes the schedule information stored in the storage unit 24, in addition to performing the functions of the control unit 21 according to the first embodiment.

The communication unit 22a performs wireless communication with the smart phone 6, in addition to performing the functions of the communication unit 22 according to the first embodiment. The communication unit 22a performs the wireless communication with the smart phone 6 using Bluetooth, Wi-Fi, or the like.

The smart phone 6 is a wireless communication device that performs wireless communication with the air-conditioner remote controller 2a and performs an operation similar to the operation that can be performed by the user interface 26 of the air-conditioner remote controller 2a. The smart phone 6 has a dedicated application installed therein that enables the wireless communication with the air-conditioner remote controller 2a. The smart phone 6 performs an operation similar to the operation of the user interface 26 via the dedicated application. Thus, a user does not have to move to where the air-conditioner remote controller 2a is placed for every operation and can operate the air conditioner 1 from the smart phone 6 on hand. The user can, for example, set and change the schedule information stored in the storage unit 24 of the air-conditioner remote controller 2a from the smart phone 6.

In the air-conditioner remote controller 2a, the control unit 21a acquires the operation information of the smart phone 6 provided by a user via the communication unit 22a. While the control unit 21a acquires the operation information from a user through the two paths in the second embodiment, the control unit 21a performs an operation similar to that performed in the first embodiment on the basis of the acquired operation information. A hardware configuration of the air-conditioner remote controller 2a is similar to the hardware configuration of the air-conditioner remote controller 2 in the first embodiment.

As described above, the air-conditioner remote controller 2a in the air conditioner system 5a according to the present embodiment can receive an operation provided by a user via the smart phone 6. A user can thus, for example, set and change the schedule information from the smart phone 6 and does not have to move to where the air-conditioner remote controller 2a is placed for every operation; therefore, user convenience can be improved in this manner.

Third Embodiment

In a third embodiment, an air conditioner system that includes air conditioners and air-conditioner remote controllers that are each connected to different external temperature sensors is described below. The difference from the first embodiment is described below.

Figure 7:
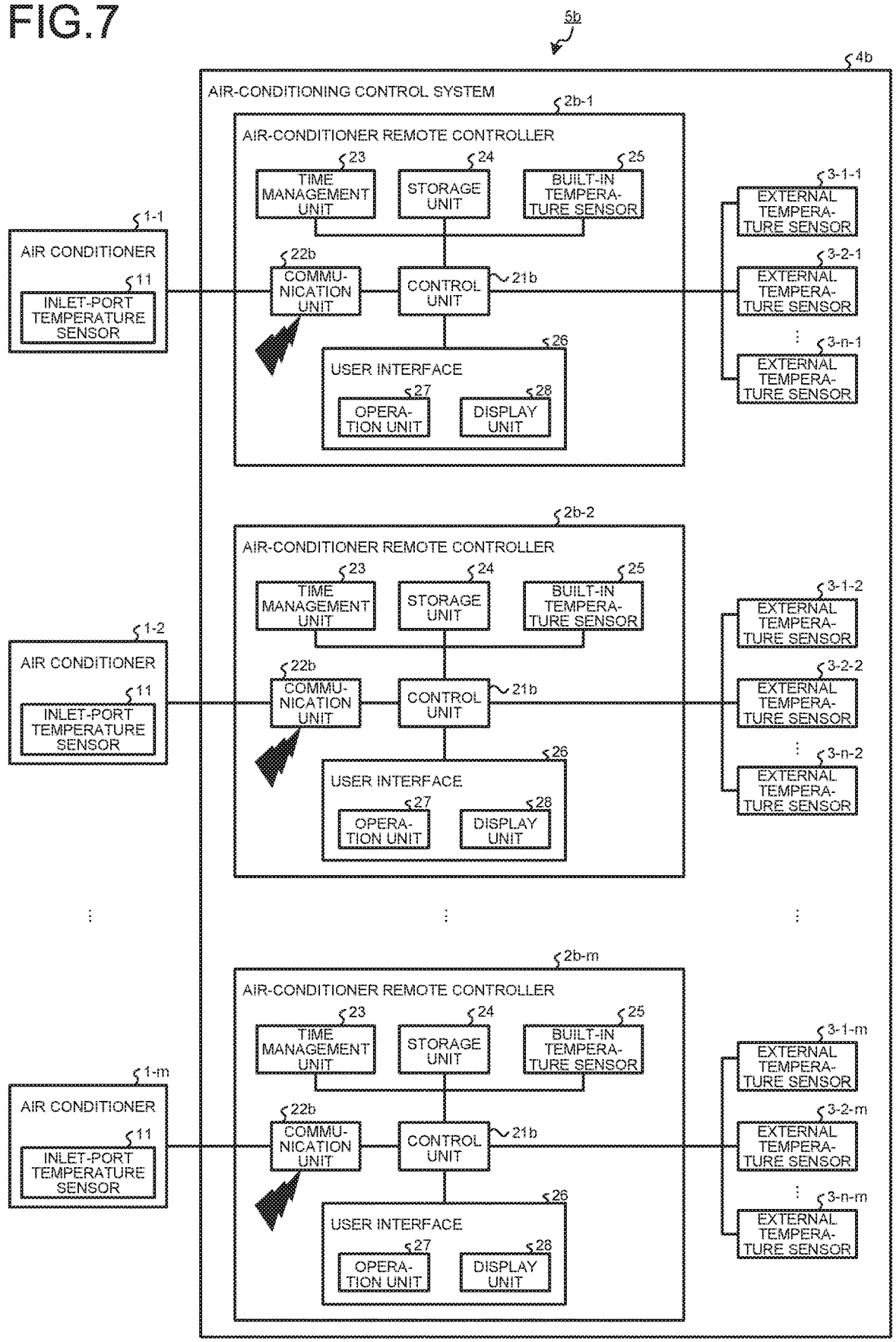
FIG. 7 is a diagram illustrating an exemplary configuration of an air conditioner system that includes air-conditioner remote controllers according to a third embodiment.

FIG. 7 is a diagram illustrating an exemplary configuration of an air conditioner system 5b, which includes air-conditioner remote controllers 2b-1, 2b-2, . . . , and 2b-m according to the third embodiment. The air conditioner system 5b includes air conditioners 1-1 to 1-m, the air-conditioner remote controllers 2b-1 to 2b-m, and external temperature sensors 3-1-1 to 3-n–1, 3-1-2 to 3-n–2, . . . , and 3-1-m to 3-n-m. The air-conditioner remote controllers 2b-1 to 2b-m and the external temperature sensors 3-1-1 to 3-n–1, 3-1-2 to 3-n–2, . . . , and 3-1-m to 3-n-m configure an air-conditioning control system 4b that controls operations of the air conditioners 1-1 to 1-m.

The air conditioners 1-1 to 1-m each have a configuration similar to the configuration of the air conditioner 1 in the first embodiment. The air conditioners 1-1 to 1-m may be referred to as the air conditioners 1 when the air conditioners 1-1 to 1-m are not distinguished from each other.

The air-conditioner remote controllers 2b-1 to 2b-m have similar configurations. The air-conditioner remote controllers 2b-1 to 2b-m may be referred to as the air-conditioner remote controllers 2b when the air-conditioner remote controllers 2b-1 to 2b-m are not distinguished from each other. The air-conditioner remote controller 2b can receive, from the other air-conditioner remote controllers 2b, room temperature information that is stored in the other air-conditioner remote controllers 2b and that is of the external temperature sensors 3 or the like that are connected to the other air-conditioner remote controllers 2b, in addition to performing the functions of the air-conditioner remote controller 2 according to the first embodiment. In comparison with the air-conditioner remote controller 2, each of the air-conditioner remote controllers 2b includes a control unit 21b and a communication unit 22b in place of the control unit 21 and the communication unit 22 of the air-conditioner remote controller 2, respectively.

The control unit 21b of the air-conditioner remote controller 2b exchanges, with the other air-conditioner remote controllers 2b, the room temperature information, information on the name of the temperature sensors, and the like stored in the storage unit 24 of the air-conditioner remote controller 2b via the communication unit 22b of the air-conditioner remote controller 2b, in addition to performing the functions of the control unit 21 according to the first embodiment.

The communication unit 22b of the air-conditioner remote controller 2b performs wireless communication with the other air-conditioner remote controllers 2b, that is, wireless communication between the air-conditioner remote controllers 2b, in addition to performing the functions of the communication unit 22 according to the first embodiment. The wireless communication between the air-conditioner remote controllers 2b is performed using Bluetooth, Wi-Fi, or the like.

The external temperature sensors 3-1-1 to 3-n–1, 3-1-2 to 3-n–2, . . . , and 3-1-m to 3-n-m are temperature sensors that are similar to the external temperature sensors 3 according to the first embodiment. The external temperature sensors 3-1-1 to 3-n–1, 3-1-2 to 3-n–2, . . . , and 3-1-m to 3-n-m may be referred to as the external temperature sensors 3 when the external temperature sensors 3-1-1 to 3-n–1, 3-1-2 to 3-n–2, . . . , and 3-1-m to 3-n-m are not distinguished from each other.

In the third embodiment, the air-conditioner remote controller 2b is connected to and performs wireless communication with the other air-conditioner remote controllers 2b via the communication unit 22b of the air-conditioner remote controller 2b and acquires the room temperature information, the information on the name of the temperature sensors, and the like stored in the other air-conditioner remote controllers 2b; therefore, the air-conditioner remote controllers 2b can share the room temperature information, the information on the name of the temperature sensors, and the like with each other. The control unit 21b of the air-conditioner remote controller 2b transmits the room temperature information, the information on the name of the temperature sensors, and the like stored in its own storage unit 24 to the other air-conditioner remote controllers 2b via the communication unit 22b. In each of the air-conditioner remote controllers 2b, the control unit 21b causes the storage unit 24 to store the room temperature information, the information on the name of the temperature sensors, and the like acquired from the other air-conditioner remote controllers 2b, together with the room temperature information acquired from its own built-in temperature sensor 25 and the external temperature sensors 3 connected to the air-conditioner remote controller 2b itself, the information on the name of the temperature sensors, and the like.

In this manner, each of the air-conditioner remote controllers 2b can perform the air-conditioning control of the air conditioner 1 that is connected to the air-conditioner remote controller 2b itself by using the room temperature information of the external temperature sensors 3 that are not directly connected to the air-conditioner remote controller 2b itself and other information. Each of the air-conditioner remote controllers 2b stores, in the storage unit 24, information, such as the room temperature information, acquired from the other air-conditioner remote controllers 2b. An operation of the control unit 21b to receive an operation of a user via the operation unit 27 of the user interface 26 and to set or change the schedule information is similar to the operation of the control unit 21 to set or change the schedule information in accordance with an operation received via the operation unit 27 of the user interface 26 in the first embodiment, although the number of temperature sensors settable is increased.

While the description has been provided using the first embodiment as an example, the description is also applicable to the second embodiment. In such a case, the communication unit 22b may have the function of the communication unit 22a according to the second embodiment. A hardware configuration of each of the air-conditioner remote controllers 2b is similar to the hardware configuration of the air-conditioner remote controller 2 in the first embodiment.

As described above, in the air conditioner system 5b according to the present embodiment, each of the air-conditioner remote controllers 2b connected to one of the air conditioners 1 is connected by wireless communication to the other air-conditioner remote controllers 2b that perform the air-conditioning control of the air conditioners 1 that are not the one of the air conditioners 1 and acquires room temperature information stored in the other air-conditioner remote controllers 2b from the other air-conditioner remote controllers 2b. In this manner, each of the air-conditioner remote controllers 2b can perform the air-conditioning control of one of the air conditioners 1 that is connected to the air-conditioner remote controller 2b itself by using the room temperature information of the external temperature sensors 3 that are not directly connected to the air-conditioner remote controller 2b itself and other information; thus, system extensibility can be enhanced.

While a case in which the room temperature information and the like are transmitted and received between the air-conditioner remote controllers 2b has been described, an operation that is characteristic of the air-conditioner remote controllers 2b is not limited to this case. For example, each of the air-conditioner remote controllers 2b connected to one of the air conditioners 1 may transmit, to the other air-conditioner remote controllers 2b that are connected to the other air conditioners 1 that are not directly connected to the air-conditioner remote controller 2b itself, a basic operating instruction, such as an operation instruction or a set temperature instruction, for the other air conditioners 1 by wireless communication, and whereby each of the air-conditioner remote controllers 2b is enabled to perform the air-conditioning control of the other air conditioners 1 via the other air-conditioner remote controllers 2b. That is, the control unit 21b of each of the air-conditioner remote controllers 2b connected to one of the air conditioners 1 operates, via the communication unit 22b, the other air conditioners 1 on the basis of the operation information received via the operation unit 27 of the user interface 26, air conditioning of the other air conditioners 1 being controllable by the other air-conditioner remote controllers 2b. In this manner, a user can perform, by the air-conditioner remote controller 2b, the air-conditioning control of the air conditioners 1 that are not directly connected to the air-conditioner remote controllers 2b itself.

Fourth Embodiment

In a fourth embodiment, a case is described in which the air-conditioning control is performed by preferentially using room temperature information of a temperature sensor that is placed in an area where a person is present. The difference from the first embodiment is described below.

Figure 8:
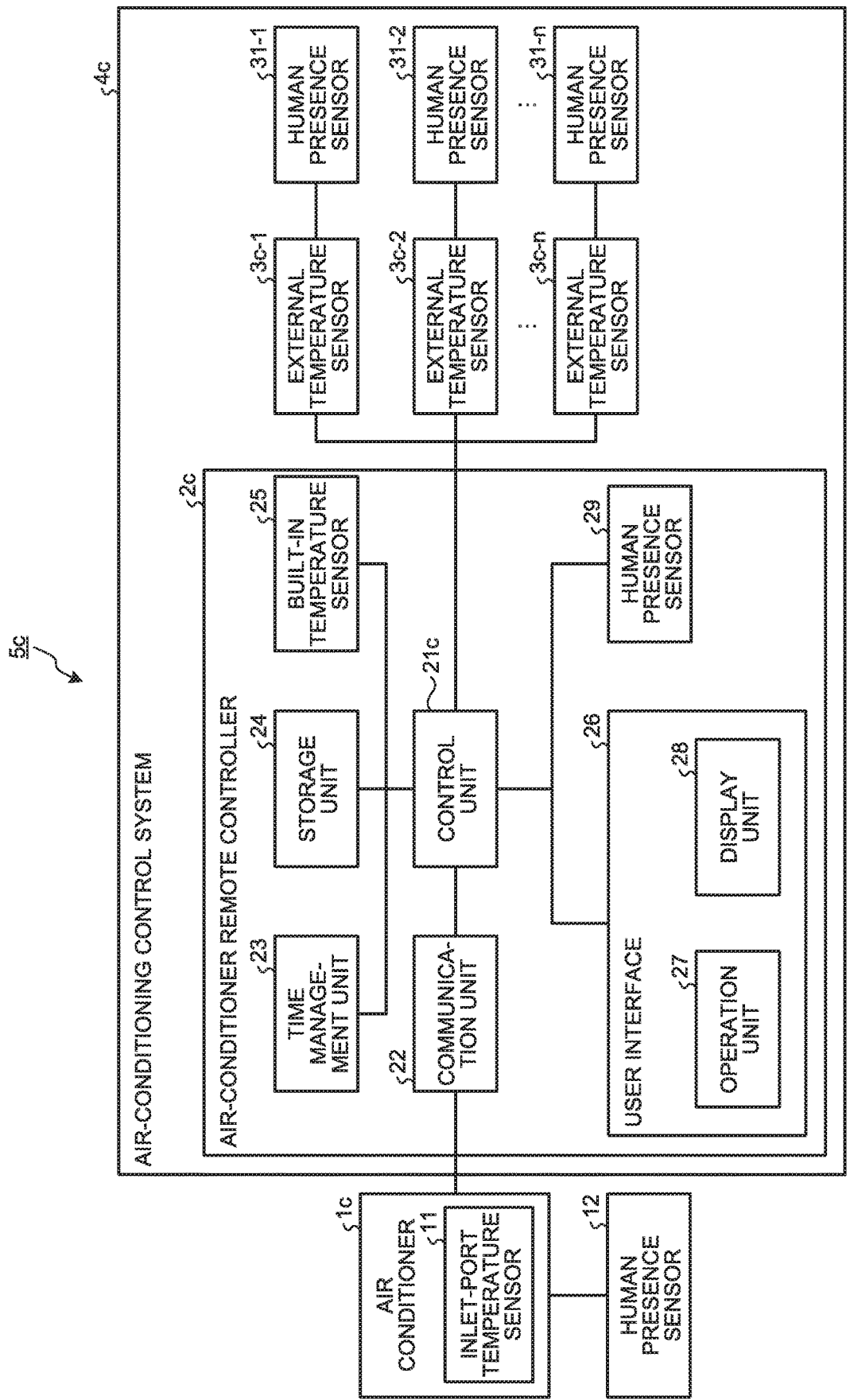
FIG. 8 is a diagram illustrating an exemplary configuration of an air conditioner system that includes an air-conditioner remote controller according to a fourth embodiment.

FIG. 8 is a diagram illustrating an exemplary configuration of an air conditioner system 5c, which includes an air-conditioner remote controller 2c according to the fourth embodiment. The air conditioner system 5c includes an air conditioner 1c, a human presence sensor 12, the air-conditioner remote controller 2c, external temperature sensors 3c-1, 3c-2, . . . , and 3c-n, and human presence sensors 31-1, 31-2, . . . , and 31-n. The air conditioner 1c is connected to the human presence sensor 12. The air-conditioner remote controller 2c includes a human presence sensor 29 built therein. Each of the external temperature sensors 3c-1, 3c-2, . . . , and 3c-n is connected to one of the human presence sensors 31-1, 31-2, . . . , and 31-n. The air-conditioner remote controller 2c, the external temperature sensors 3c-1, 3c-2, . . . , and 3c-n, and the human presence sensors 31-1, 31-2, . . . , and 31-n configure an air-conditioning control system 4c that controls an operation of the air conditioner 1c.

The human presence sensors 12, 29, 31-1, 31-2, . . . , and 31-n each sense whether or not a person is present in an area having a temperature measured by a temperature sensor connected thereto.

The air conditioner 1c transmits sensing information that is indicative of presence or absence of a person and that is obtained by the human presence sensor 12 to the air-conditioner remote controller 2c, in addition to performing the functions of the air conditioner 1 according to the first embodiment. The human presence sensor 12, which is placed near the inlet-port temperature sensor 11 of the air conditioner 1c, may be configured such that the sensing information indicative of the presence or absence of a person can be transmitted directly to the air-conditioner remote controller 2c.

The air-conditioner remote controller 2c acquires the sensing information from each of the human presence sensors together with the room temperature information of the temperature sensors and stores the sensing information in association with the room temperature information, in addition to performing the functions of the air-conditioner remote controller 2 according to the first embodiment. In comparison with the air-conditioner remote controller 2, the air-conditioner remote controller 2c includes a control unit 21c in place of the control unit 21 of the air-conditioner remote controller 2 and further includes the human presence sensor 29.

The control unit 21c acquires the sensing information from each of the human presence sensors, which is placed in an area where a corresponding one of the temperature sensors is placed, together with the room temperature information from each of the temperature sensors, and causes the storage unit 24 to store the sensing information of the human presence sensors in association with the room temperature information of the temperature sensors, in addition to performing the functions of the control unit 21 according to the first embodiment. The storage unit 24 stores the sensing information from the human presence sensors in association with the room temperature information. If the schedule information in the storage unit 24 is set to give priority to room temperature information of the temperature sensor that is placed in an area where a person is present, the control unit 21c transmits the room temperature information of the temperature sensor that is placed in the area where a person is present to the air conditioner 1c as room temperature information to be used in the air-conditioning control of the air conditioner 1c. The control unit 21a acquires the room temperature information from each of the temperature sensors and the sensing information from each of the human presence sensors at regular time intervals and updates the room temperature information and the sensing information in the storage unit 24.

FIG. 9 is a diagram illustrating an example of the schedule information stored in the storage unit 24 of the air-conditioner remote controller 2c according to the fourth embodiment. While the schedule information illustrated in FIG. 9 is similar to the schedule information in the first embodiment illustrated in FIG. 2 in the setting of the temperature sensors in the time zones, human presence priority is set in the schedule information in FIG. 9 to give priority to room temperature information from the temperature sensor that is placed in an area where the presence of a person has been sensed by a corresponding one of the human presence sensors in time zones from 10:00 to 18:00 of weekdays from Monday to Friday. A user can set the human presence priority via the user interface 26 similarly to the setting of the schedule information in the first embodiment.

If the current time is in a time zone in which the human presence priority is set in the schedule information, the control unit 21c references the sensing information of the human presence sensors stored in the storage unit 24 and selects the temperature sensor that is placed in an area where a corresponding one of the human presence sensors that has sensed the presence of a person is placed as a temperature sensor that measures the room temperature to be used in the air-conditioning control of the air conditioner 1c. The control unit 21c acquires, from the storage unit 24, the room temperature information from the temperature sensor that is placed in the area where the corresponding one of the human presence sensors that has sensed the presence of a person is placed and transmits the acquired room temperature information to the air conditioner 1c via the communication unit 22. If multiple human presence sensors have sensed the presence of persons, the control unit 21c selects multiple temperature sensors that are placed in areas where the multiple human presence sensors that have sensed the presence of persons are placed as temperature sensors that measure the room temperature to be used in the air-conditioning control of the air conditioner 1c. The control unit 21c acquires, from the storage unit 24, the room temperature information from the multiple temperature sensors that are placed in the areas where the multiple human presence sensors that have sensed the presence of persons are placed, calculates a mean value of multiple pieces of the room temperature information, and transmits the value to the air conditioner 1c via the communication unit 22.

If the current time is in a time zone in which the human presence priority is set in the schedule information and none of the human presence sensors has sensed the presence of a person in the time zone, the control unit 21c selects a temperature sensor that is set in the schedule information as a temperature sensor that measures the room temperature to be used in the air-conditioning control of the air conditioner 1c in accordance with the schedule information. The control unit 21c acquires, from the storage unit 24, the room temperature information of the target temperature sensor that is set in the schedule information and transmits the acquired room temperature information to the air conditioner 1c via the communication unit 22. The other operations of the control unit 21c are similar to the operations of the control unit 21 in the first embodiment.

Figure 10:
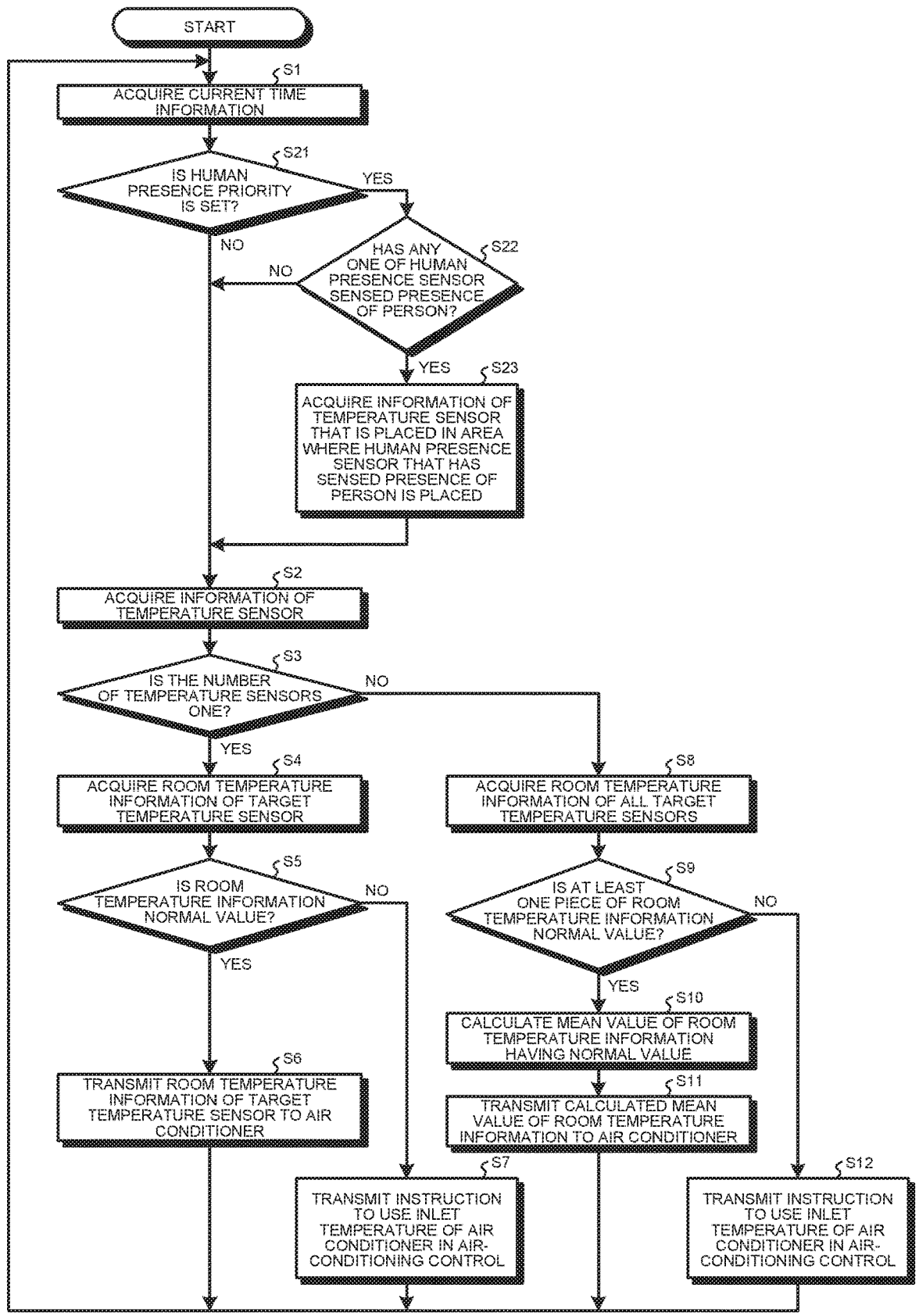
FIG. 10 is a flowchart illustrating an operation of the air-conditioner remote controller in the air conditioner system according to the fourth embodiment to change the temperature sensors that measure room temperature to be used in the air-conditioning control of an air conditioner in accordance with the schedule information and control an operation of the air conditioner.

FIG. 10 is a flowchart illustrating an operation of the air-conditioner remote controller 2c in the air conditioner system 5c according to the fourth embodiment to change the temperature sensors that measure the room temperature to be used in the air-conditioning control of the air conditioner 1c in accordance with the schedule information and control the operation of the air conditioner 1c.

First, the control unit 21c acquires the current time information from the time management unit 23 (step S1). The control unit 21c checks the schedule information stored in the storage unit 24 and determines whether or not the human presence priority is set in the schedule information (step S21). If the human presence priority is not set (step S21: no), the control unit 21c acquires information on the temperature sensor(s) set in a time zone that corresponds to the current time from the schedule information (step S2).

If the human presence priority is set (step S21: yes), the control unit 21c references the storage unit 24 and determines whether or not any one of the human presence sensors has sensed presence of a person (step S22). If none of the human presence sensors has sensed the presence of a person (step S22: no), the control unit 21c acquires information on the temperature sensor(s) set in the time zone that corresponds to the current time from the schedule information (step S2).

If any one of the human presence sensors has sensed the presence of a person (step S22: yes), the control unit 21c acquires information on the temperature sensor that is placed in an area where the human presence sensor that has sensed the presence of a person is placed as a temperature sensor that measures the room temperature to be used in the air-conditioning control of the air conditioner 1c (step S23). The other operations of the control unit 21c in step S3 and beyond are similar to the operations of the control unit 21 in the first embodiment illustrated in FIG. 3.

As described above, the air-conditioner remote controller 2c references the information of the human presence sensors that are set in the schedule information in the storage unit 24 and switches the information of the temperature sensors accordingly, thereby enabling control of the air conditioner 1c using a temperature that is closer to the room temperature near a user and thus improving user comfort.

While the description has been provided using the first embodiment as an example, the description is also applicable to the second and third embodiments. In a hardware configuration of the air-conditioner remote controller 2c, the human presence sensor 29 is achieved with a sensor such as an infrared sensor. The other parts of the configuration are similar to the parts of the configuration of the air-conditioner remote controller 2 in the first embodiment.

As described above, the air-conditioner remote controller 2c according to the present embodiment causes the human presence sensors to sense whether or not a person is present in areas where the temperature sensors are placed and performs the air-conditioning control of the air conditioner 1c using the temperature sensor that is placed in an area where a person is present as a temperature sensor that measures the room temperature to be used in the air-conditioning control of the air conditioner 1c. In this manner, the air conditioner system 5c can improve user comfort.

Additionally, if human presence priority is set in the schedule information and multiple human presence sensors have sensed the presence of persons, the air-conditioner remote controller 2c uses all of the temperature sensors that are placed in areas where the multiple human presence sensors that have sensed the presence of persons are placed as temperature sensors that measure the room temperature to be used in the air-conditioning control of the air conditioner 1c. If there are more than one area where the human presence sensor that has sensed the presence of a person is placed, the air-conditioner remote controller 2c calculates a mean value of the room temperature information from the temperature sensors that each measure the room temperature of a corresponding one of the areas and use the value as the room temperature information to be transmitted to the air conditioner 1c. Thus, in a time zone in which users are likely to be in more than one room, the air conditioner system 5c can avoid cooling or heating excessively one of the rooms, thereby providing a comfortable space for all the users.

The configurations in the embodiments described above represent some examples of the present invention, and they can be combined with another publicly known technique and partially omitted or modified without departing from the spirit of the present invention.

The invention claimed is:

1. An air-conditioner remote controller in an air conditioner system that includes the air-conditioner remote controller and an air conditioner that performs air-conditioning control using room temperature information received from the air-conditioner remote controller, the air conditioner system further including a plurality of external temperature sensors placed outside the air-conditioner remote controller and outside the air conditioner and located in an area to be heated or cooled by the air conditioner, and an inlet-port temperature sensor placed at an inlet port of the air conditioner, the air-conditioner remote controller comprising:
    a built-in temperature sensor disposed inside the air-conditioner remote controller to measure a room temperature near the air-conditioner remote controller;
    a storage to store room temperature information that is information on the room temperature measured by the built-in temperature sensor, the plurality of external temperature sensors, and the inlet-port temperature sensor and store schedule information that sets, for each time zone, at least two temperature sensors of the built-in temperature sensor, the external temperature sensors, and the inlet-port temperature sensor to measure a room temperature to be used as room temperature information in the air-conditioning control of the air conditioner; and
    a controller to perform control such that the room temperature information from the at least two temperature sensors set by the schedule information is acquired from the storage and the acquired room temperature information is transmitted to the air conditioner in accordance with the schedule information, wherein the controller determines whether the acquired room temperature information from at least one of the at least two temperature sensors is within a normal value range so as to use a mean of the room temperature information values from at least one of the at least two temperature sensors within the normal value range and, when the acquired room temperature information in all of the at least two temperature sensors is not within the normal value range, instructs the air conditioner to perform the air-conditioning control using an inlet temperature that is measured by the inlet-port temperature sensor placed at the inlet port of the air conditioner.

2. The air-conditioner remote controller according to claim 1, wherein, when the at least two temperature sensors among the built-in temperature sensor, the external temperature sensors, and the inlet-port temperature sensor are set for a time zone in the schedule information, the controller performs control such that a plurality of pieces of room temperature information of the at least two temperature sensors are acquired from the storage, a mean value of the pieces of room temperature information is calculated, and the calculated mean value is transmitted to the air conditioner.

3. The air-conditioner remote controller according to claim 1, wherein
the controller acquires the room temperature information from the built-in temperature sensor, the external temperature sensors, and the inlet-port temperature sensor at regular time intervals and updates the room temperature information in the storage.

4. The air-conditioner remote controller according to claim 1, comprising an operator to receive an operation to set or change the schedule information, wherein
the controller sets or changes the schedule information in accordance with operation information received by the operator.

5. The air-conditioner remote controller according to claim 4, comprising a communicator to perform wireless communication with a wireless communication device that receives an operation to set or change the schedule information, wherein
the controller sets or changes the schedule information in accordance with operation information that is received by the wireless communication device and acquired via the communicator.

6. The air-conditioner remote controller according to claim 1, comprising, when the air conditioner system comprises a plurality of air conditioners and a plurality of air-conditioner remote controllers, a communicator to perform wireless communication between the air-conditioner remote controllers, wherein
the controller acquires room temperature information stored in another of the air-conditioner remote controllers via the communicator and causes the storage to store the room temperature information.

7. The air-conditioner remote controller according to claim 6, wherein the controller operates, via the communicator, another of the air conditioners, air conditioning of the another of the air conditioners being controllable by the another of the air-conditioner remote controllers.

8. The air-conditioner remote controller according to claim 1, wherein,
when a plurality of human presence sensors to sense whether a person is present are placed in areas that have room temperature measured by the built-in temperature sensor, the external temperature sensors, and the inlet-port temperature sensor, the storage stores sensing information from the human presence sensors in association with the room temperature information, and
when the schedule information is set to give priority to room temperature information from a temperature sensor that is placed in an area that a person is present in, the controller performs control such that room temperature information that is associated with sensing information of a human presence sensor that is placed in the area that a person is present in is acquired from the storage and the acquired room temperature information is transmitted to the air conditioner.

9. The air-conditioner remote controller according to claim 8, wherein,
when a person is present in a plurality of areas, the controller performs control such that a plurality of pieces of room temperature information that are associated with sensing information from human presence sensors that are placed in the areas that a person is present in are acquired from the storage, a mean value of the pieces of room temperature information is calculated, and the calculated mean value is transmitted to the air conditioner.

10. The air-conditioner remote controller according to claim 1, wherein,
the storage comprises one of a read only memory (ROM), a flash memory, an erasable programmable ROM (EPROM), and an electrically EPROM (EEPROM), a magnetic disk, a flexible disk, an optical disk, a compact disk, a mini disk, or a digital versatile disc (DVD).

* * * * *